Oct. 11, 1955     E. P. KINNE     2,720,321
DRAFT CONNECTION
Original Filed March 18, 1946     2 Sheets-Sheet 1
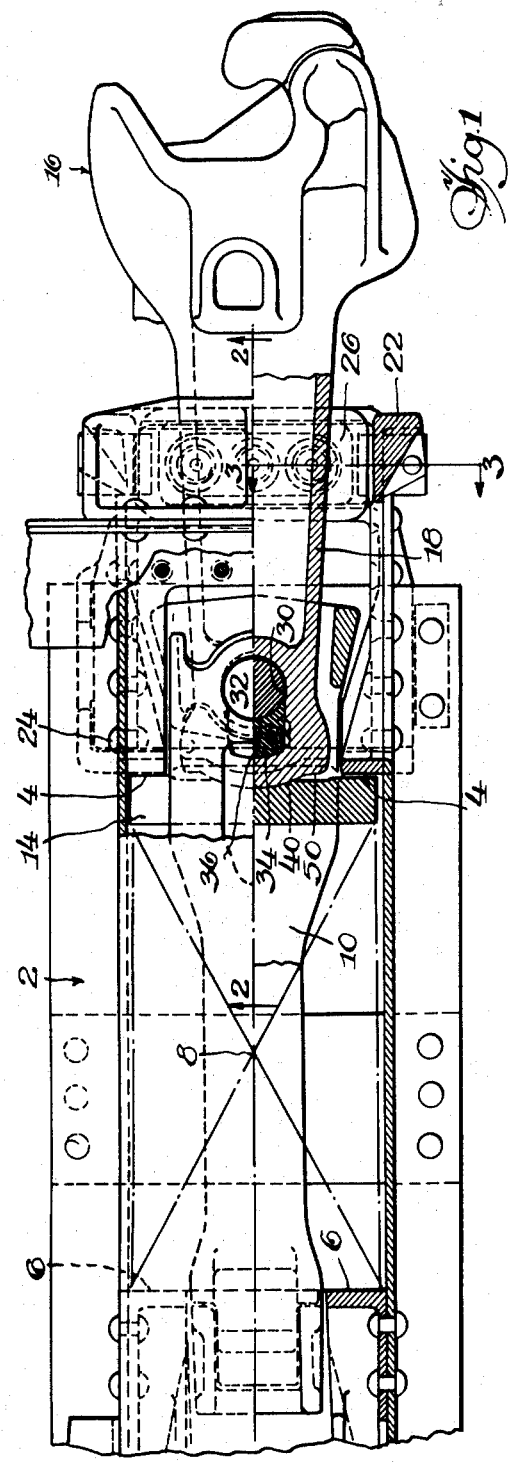
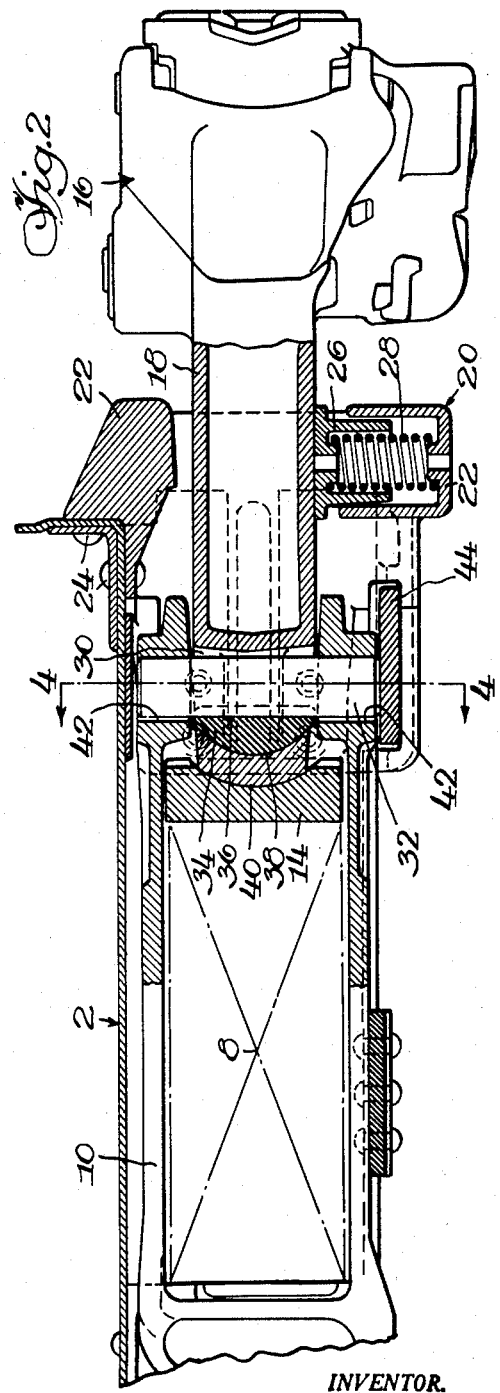
INVENTOR.
Edmund P. Kinne
BY

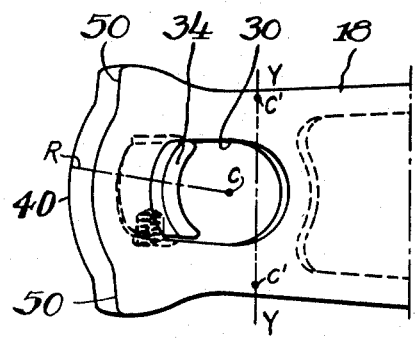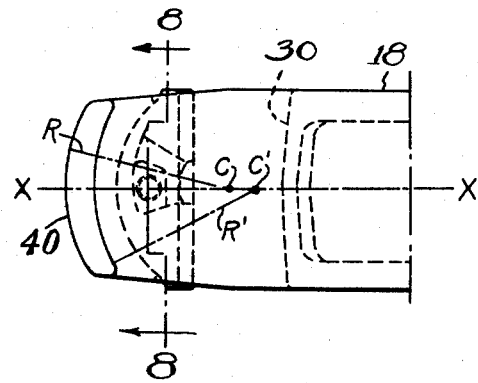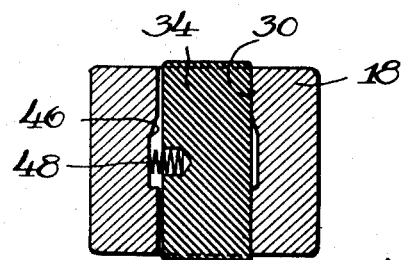

United States Patent Office 2,720,321
Patented Oct. 11, 1955

2,720,321

DRAFT CONNECTION

Edmund P. Kinne, Northbrook, Ill., assignor to American Steel Foundries, Chicago, Ill., a corporation of New Jersey Original application March 18, 1946, Serial No. 655,145, now Patent No. 2,589,264, dated March 18, 1952. Divided and this application July 28, 1951, Serial No. 239,156

10 Claims. (Cl. 213—72)

This invention relates to couplers and more particularly to a novel improved coupler construction for railway cars. The present application is a division of my copending application Serial No. 655,145, filed March 18, 1946, now Patent Number 2,589,264, issued March 18, 1952.

A general object of the invention is to devise a coupler shank and bearing block assembly wherein resilient means are provided for maintaining the bearing block in frictional engagement with the coupler shank within its pin opening, the block and shank being formed and arranged to define a pin hole.

A further object of the invention is to interlock the resilient means with the bearing block in such manner as to accommodate slidable engagement between the shank and the resilient means during certain angular movement of the shank with respect to its pivot pin.

A more specific object of the invention is to provide a novel pivotal connection between the coupler shank and the coupler yoke wherein the shank is provided with a pin opening and a pin bearing block mounted therewithin for arcuate face engagement with the pin and the shank, thereby accommodating vertical and horizontal angling of the coupler shank while maintaining a relatively snug connection between the shank and the pin, means being provided for maintaining the pin bearing block in assembled relationship with the coupler shank during assembly and disassembly thereof with respect to the yoke portion of the two-piece coupler structure.

The foregoing and other objects and advantages of the invention will become apparent from a consideration of the following specification and the accompanying drawings, wherein:

Figure 1 is a top plan view of the novel device as applied to a standard railway car, portions of the structure being shown in horizontal section;

Figure 2 is a side elevation of the structure shown in Figure 1 with a portion of the structure illustrated in central vertical section, as indicated by the line 2—2 of Figure 1;

Figures 3 to 5 inclusive illustrate in detail the manner in which the coupler bearing block is mounted within the coupler shank, Figure 3 being a fragmentary top plan view of the shank with the bearing block applied thereto, Figure 4 being a side elevation of the structure shown in Figure 3, and Figure 5 being a sectional view taken in the vertical plane indicated by the line 5—5 of Figure 4.

Describing the invention in detail and referring first to Figures 1 and 2, the invention is illustrated as applied to a standard car body 2 comprising front and rear draft lugs 4 and 6 (Figure 1) adapted to engage a conventional draft gear diagrammatically indicated at 8. The draft gear is housed within a yoke 10, said draft gear being in engagement with a special follower 14 normally adapted to abut the front draft lugs 4. It will be understood that under normal conditions the draft gear 8 bears at its rear extremity against the rear draft lugs 6. However, under pulling conditions the draft gear may be compressed and may become disengaged from the rear draft lugs 6.

The coupler generally designated 16 comprises a shank 18 supported by a carrier generally designated 20 (Figure 2). The carrier comprises a casting 22 mounted as at 24 on the car body 2, the front draft lugs 4 being preferably formed on said casting. A carrier plate 26 is supported by springs 28 mounted on the casting 22, and the carrier plate 26 engages the shank 18 to afford a resilient support therefor, the shank 18 being slidable against the plate 26 during horizontal or lateral angling of the shank, as hereinafter described.

The shank 18 adjacent the rear extremity thereof is provided with a pin opening 30 receiving a pivot pin 32 and a pin bearing block 34 in complementary arcuate face engagement at 36 (Figures 1 and 2) with the pin 32 and in complementary arcuate face engagement at 38 (Figure 2) with the coupler shank which is in spherical face engagement as at 40 (Figures 1 and 2) with the follower 14 along complementary convex, concave surfaces. The pin is received within openings 42 through the yoke and is supported by a retainer plate 44 (Figure 1). Thus the yoke 10 affords a pocket for the rear end of the coupler shank 18 which bears against the follower 14, which may be regarded as the rear wall of the pocket.

It will be understood that during horizontal or lateral angling of the coupler shank 18, the bearing block 34 slides as at 36 against the pin 32 and the shank 18 slides as at 40 against the follower 14. The pin 32, under these conditions, may be rotated to some extent by friction developed at 36. During vertical angling of the shank 18, the shank slides as at 38 and 40 against the block 34 and the follower 14 respectively.

Referring now to Figures 3 to 5 which illustrate in detail the mounting of the bearing block 34 within the pin opening 30 in the shank 18, it will be seen that the shank 18 is recessed as at 46 (Figure 5) within the opening 30 to afford a pocket for a spring 48 which urges the block 34 laterally within the opening 30, thereby maintaining the block 34 in assembled relationship within said opening during assembly and disassembly of the shank 18 and yoke 10. In this connection it may be noted that the recess at 46, as best seen in Figure 4, is so shaped as to accommodate sliding of the spring 48 against the shank 18 during vertical angling of the latter with respect to the pin 32, as above described.

I claim:

1. In a coupler mounting, a coupler pocket, a coupler shank received therewithin, pivot means securing said shank within said pocket, said shank being capable of angling about said pivot means in both vertical and horizontal directions, complementary convex, concave abutting surfaces on the end of said shank and the rear wall of said pocket respectively, a bearing block housed within said shank and interlocked therewith against substantially relative movement during angling of said shank in one only of said directions, said block having convex, concave engagement at its rear extremity with said shank along surfaces concentric with said first-mentioned surfaces, and said block having engagement at its forward extremity with said pivot means and being slidable thereagainst during angling of said shank in said last-mentioned direction, and resilient means housed within said shank and compressed thereagainst and against a side of said block intermediate said extremities thereof for urging the latter into snug engagement with a complementary surface of said shank, whereby said block is maintained in assembled relationship within said shank during assembly and disassembly of said pivot means with respect thereto.

2. In a device of the class described, a coupler pocket defined by a rear wall and spaced walls with aligned pin openings therethrough, a coupler shank comprising on the inner end thereof a surface engaging said rear wall along complementary convex, concave areas, a pin opening through said shank, a pin extending through all of said openings, said shank being capable of vertical and horizontal pivotal movement within said pocket, a bearing block within the last-mentioned opening having complementary convex, concave face engagement at one end of said block with said shank along surfaces concentric with said areas, said block having complementary cylindrical face engagement at its opposite end with said pin and being interlocked with said shank against substantially relative movement with respect thereto during pivotal movement thereof in one plane, and resilient means compressed against said shank at one side of said last-mentioned opening and against the adjacent side of said block intermediate its ends to maintain the latter in assembled relationship within said last-mentioned opening during assembly and disassembly of said pin.

3. In a coupler mounting, a coupler shank, a member in complementary spherical face engagement with the rear end of said shank, a yoke embracing the rear end of said shank, aligned vertical openings through said yoke and said shank, a substantially vertical pin extending through said openings to afford a pivotal connection between said yoke and said shank, a pin bearing block in said shank opening, said block being in complementary spherical face engagement at the rear extremity thereof with said shank, and said block being in complementary cylindrical face engagement at the front thereof with said pin whereby vertical and horizontal angling of said shank relative to said yoke is accommodated, and spring means in said shank opening compressed against said shank and against a side of said block intermediate its ends to maintain the latter in assembled relationship with said shank during removal and insertion of said pin.

4. In a coupler mounting, a coupler shank, a member in complementary spherical face engagement with the rear end of said shank, a yoke receiving the rear end of said shank, a substantially vertical pin extending through aligned openings in said yoke and said shank to afford a pivotal connection therebetween, a pin bearing block in said shank opening, said block being in cylindrical face engagement and spherical face engagement at opposite ends thereof with said pin and said shank respectively, and spring means in said shank opening compressed against said shank and a side of said block intermediate said ends thereof to maintain the latter in assembled relationship within said shank opening during removal and insertion of said pin.

5. A coupler shank and bearing block assembly comprising a coupler shank with an opening therethrough, an arcuate face at the rear extremity of said opening, a bearing block in said opening having an arcuate face complementary to and seated against the first-mentioned face, opposed arcuate surfaces on said block and shank respectively defining a pin hole, and spring means compressed between said shank and one side of said block.

6. A coupler shank and bearing block assembly comprising a coupler shank having an opening therethrough and having an arcuate face at the rear extremity of said opening, bearing block means in said opening having an arcuate face complementary to and seated against the first-mentioned face, opposed arcuate surfaces on said block means and shank, respectively, said opposed surfaces defining a pin hole, and spring means compressed between the said shank and block means and reacting therebetween in a line of force forwardly of said faces.

7. An assembly according to claim 6, wherein the spring means are anchored in a complementary recess of the block means and are slidable in a complementary recess of the shank.

8. An assembly according to claim 7, wherein the recess is tapered toward one of its upper and lower edges to facilitate removal of said block means and spring means from the opening in the shank.

9. A coupler shank and bearing block assembly comprising a coupler shank member having an opening therethrough and having an arcuate face at the rear extremity of said opening, a bearing block member movably positioned in said opening and having an arcuate face complementary to and seated against the first-mentioned face, opposed arcuate surfaces on said members defining a pin hole, a substantially round opening in one of the members, a coil spring complementary to said opening and positioned therein for movement with said one member, said spring being under compression between the members on a compressional axis disposed forwardly of said faces.

10. A coupler shank and bearing block assembly comprising a shank having an opening therethrough, a bearing block unit in said opening seated along its rear face against a complementary vertically curved surface of the shank, said shank having a rear extremity curved both vertically and horizontally, opposed horizontally curved surfaces on the unit and shank, respectively, in said opening and defining a pin hole therethrough, and spring means compressed between the unit and shank along an axis passing through the unit between the hole and the first-mentioned surface.

References Cited in the file of this patent

UNITED STATES PATENTS

| | | |
|---|---|---|
| 1,859,535 | Schmidt et al. | May 24, 1932 |
| 2,212,843 | Metzger | Aug. 27, 1940 |
| 2,254,302 | Metzger | Sept. 2, 1941 |
| 2,590,868 | Kayler | Apr. 1, 1952 |